United States Patent

Newell

[15] 3,663,804

[45] May 16, 1972

[54] REVERSIBLE TERNARY COUNTER

[72] Inventor: Richard M. Newell, Livermore, Calif.

[73] Assignee: Zeta Research, Inc., Lafayette, Calif.

[22] Filed: Aug. 18, 1970

[21] Appl. No.: 64,775

[52] U.S. Cl. ....................235/92 LG, 235/92 R, 235/92 EV, 235/92 MB, 235/92 VA, 235/92 PE, 328/46

[51] Int. Cl. ....................G06m 3/04

[58] Field of Search.........235/92 VA, 92 EV, 92 MC, 92 PE; 328/46

[56] References Cited

UNITED STATES PATENTS 3,200,339 8/1965 Gorlin..............................235/92 VA 3,423,576 1/1969 Abe..................................235/92 EV

*Primary Examiner*—Maynard R. Wilbur
*Assistant Examiner*—Robert F. Gnuse
*Attorney*—Flehr, Hohbach, Test, Albritton & Herbert

[57] ABSTRACT

Reversible ternary counter utilizing standard flip-flops and logic gates to provide a low cost counter having an easily decoded output. Means is included for generating a carry pulse whenever the counter overflows in either counting direction and for generating a rounding pulse if the counter is reset while in its high output state. A plurality of stages incorporating the invention can be cascaded to provide a counter having $3^N$ output states, where N is the number of stages cascaded.

11 Claims, 5 Drawing Figures

Patented May 16, 1972

3,663,804

2 Sheets-Sheet 1

INVENTOR.
Richard M. Newell
BY Flehr, Hohbach, Test, Albritton & Herbert
Attorneys

| $t_n$ | | $t_{n-1}$ | |
|---|---|---|---|
| J | K | Q | $\bar{Q}$ |
| 1 | 1 | $Q_n$ | $\bar{Q}_n$ |
| 1 | 0 | 1 | 0 |
| 0 | 1 | 0 | 1 |
| 0 | 0 | $\bar{Q}_n$ | $Q_n$ |
Fig. 2
| COUNT STATE | $\overline{A+B}$ | A | B | UP |
|---|---|---|---|---|
| 0 | 1 | 0 | 0 | 1 |
| 1 | 0 | 1 | 0 | 1 |
| 2 | 0 | 0 | 1 | 1 |
| 0 | 1 | 0 | 0 | 1 |
| 2 | 0 | 0 | 1 | 0 |
| 1 | 0 | 1 | 0 | 0 |
| 0 | 1 | 0 | 0 | 0 |
Fig. 3
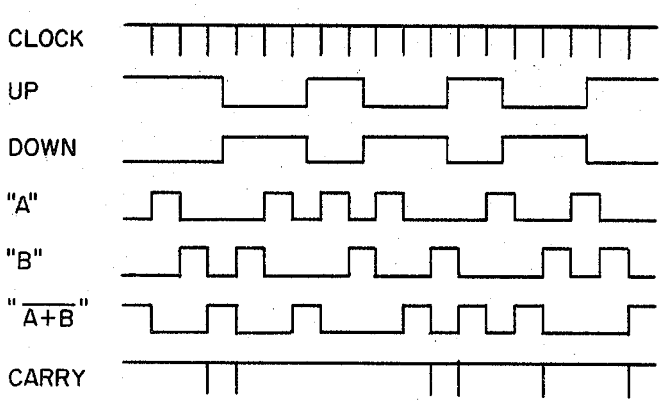
Fig. 4
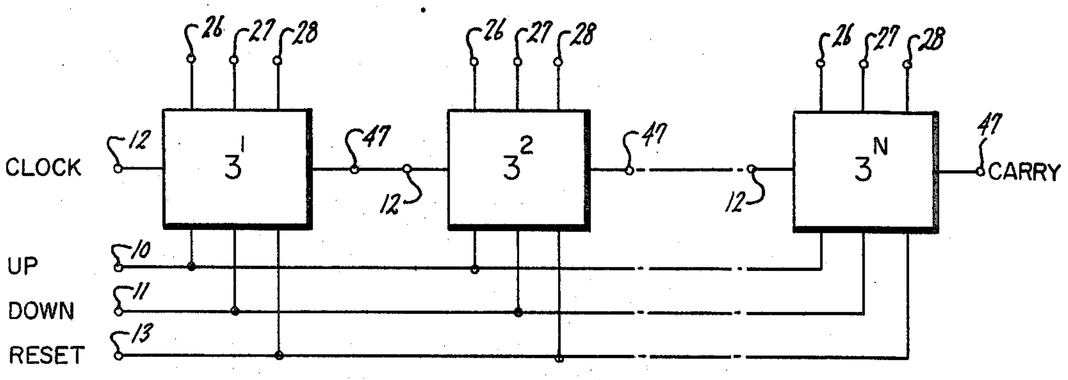
Fig. 5
INVENTOR.
Richard M. Newell
BY Flehr, Hohbach, Test, Albritton & Herbert
Attorneys

REVERSIBLE TERNARY COUNTER

BACKGROUND OF THE INVENTION

This invention pertains generally to digital counters and more particularly to a ternary counter capable of counting in either an upward or a downward direction.

Although ternary numbers, that is numbers in a system of base 3, are not as widely used as are numbers with other bases such as 10 and 2, they are nevertheless very useful in certain digital applications. For example, in a digital graphic display system of the type disclosed and claimed in copending application Ser. No. 13,570, filed Feb. 24, 1970 and assigned to the assignee of the present invention, lines extending in any direction are simulated by discrete segments or increments extending in eight reference directions. It has been found that by using an odd number of segments, a more accurate simulation of a line can be provided than could be provided with a similarly implemented even number of segments. Therefore, these segments are conveniently provided in groups of three and multiples thereof.

Heretofore, a few ternary elements, such as ternary counters and shift registers, have been provided. However, such elements generally have certain drawbacks and disadvantages which limit their usefulness. For example, the ternary counters of the prior art typically require more components, are incapable of reversible operation, produce outputs which are not so easily decoded, or cannot be cascaded without the addition of a substantial number of other components.

There is, therefore, a need for a new and improved ternary counter which overcomes the foregoing and other problems encountered with the ternary counters heretofore provided.

SUMMARY AND OBJECTS OF THE INVENTION

The present invention provides a reversible ternary counter which is capable of counting in either an upward or a downward direction. This counter utilizes conventional flip-flops and logic gates and can be constructed from readily available, low cost logic elements. It includes means for generating a carry pulse whenever the counter overflows in either direction, and a plurality of the counter stages are readily cascaded to provide $3^N$ output states, where N is the number of stages cascaded. Means is also provided for preventing the counter from locking into an illegal or unused state and for generating a rounding pulse whenever the counter is reset from its highest to its lowest output state.

It is in general an object of the present invention to provide a new and improved ternary counter which is capable of counting in both upward and downward directions.

Another object of the invention is to provide a ternary counter of the above character which includes means for generating a carry pulse whenever the counter overflows while counting in either direction.

Another object of the invention is to provide a ternary counter of the above character in which a plurality of stages are readily cascaded to provide $3^N$ output states.

Another object of the invention is to provide a ternary counter of the above character which includes means for preventing the counter from locking in an unused or illegal output state.

Another object of the invention is to provide a ternary counter of the above character which includes means for generating a rounding pulse whenever the counter is reset from its highest to its lowest output state.

Another object of the invention is to provide a ternary counter of the above character which produces an output that is readily decoded.

Another object of the invention is to provide a ternary counter of the above character which can be constructed of readily available, low cost logic elements.

Additional objects and features of the invention will be apparent from the following description in which the preferred embodiment is set forth in detail in conjunction with the accompanying drawings.

BRIEF DESCRIPTION OF THE DRAWINGS

FIG. 2 is a truth table for the flip-flops utilized in the embodiment illustrated in FIG. 1.

FIG. 3 is a truth table illustrating the operation of the embodiment illustrated in FIG. 1.

FIG. 4 is a timing diagram, graphically illustrating the operation of the embodiment shown in FIG. 1.

FIG. 5 is a block diagram illustrating the manner in which a plurality of the stages shown in FIG. 1 can be cascaded to provide a counter having $3^N$ output states.

DESCRIPTION OF THE PREFERRED EMBODIMENT

Figure 1:
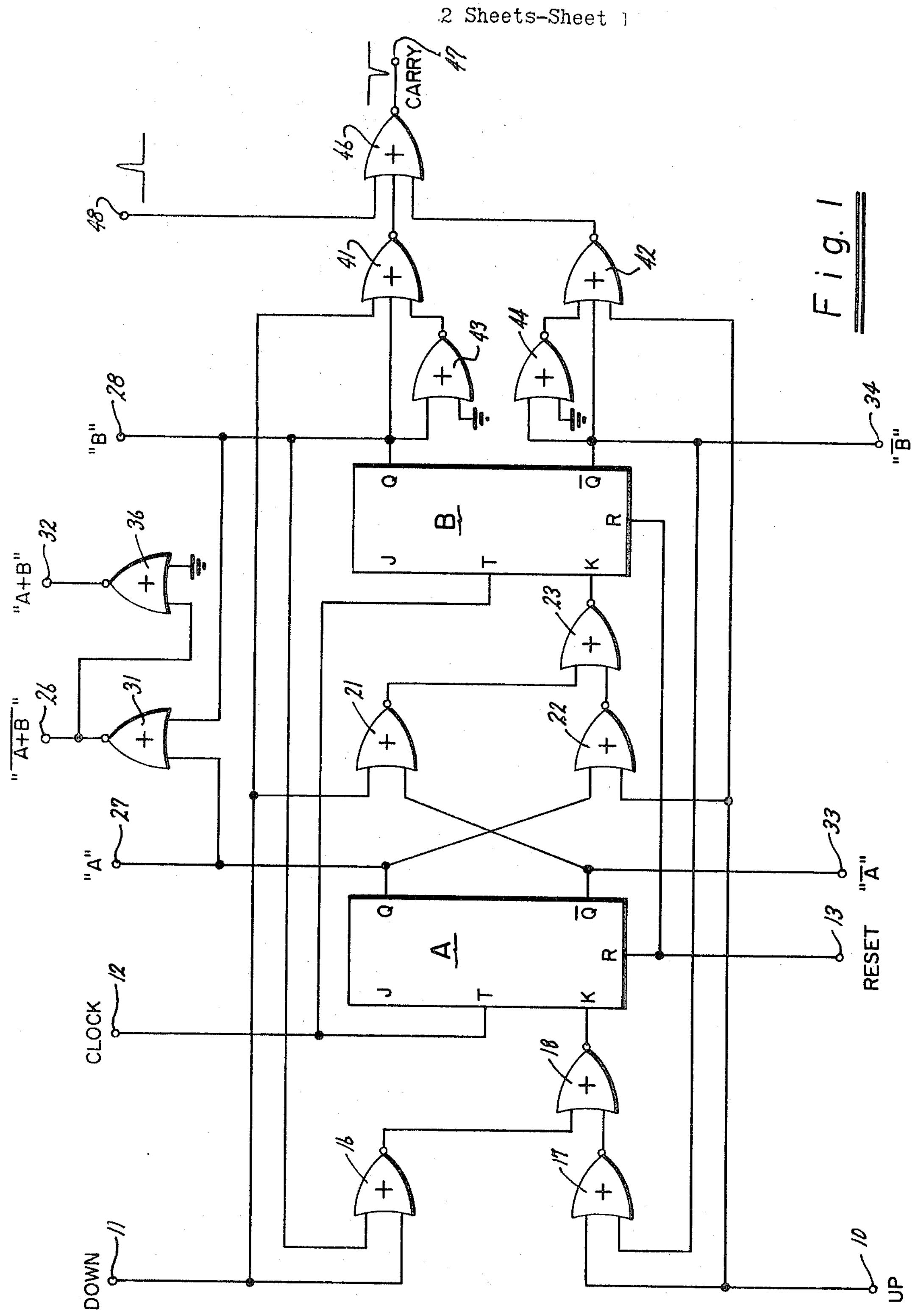
FIG. 1 is a block diagram of one embodiment of a reversible ternary counter incorporating the present invention.

As illustrated in FIG. 1, the reversible ternary counter includes input terminals 10 and 11 for receiving up and down counting control signals, a clock input terminal 12, counting means having three discrete output states, steering means for conditioning the counting means to count the clock pulses in a direction determined by the up and down counting control signals at the input terminals, and means for generating a carry pulse when the counting means overflows in either direction.

The input terminals 10 and 11 are provided for receiving up and down counting control signals, respectively. These signals consist of step voltages which are inversely related to each other. Thus, for example, when the up counting control voltage is high, the down counting control voltage is low.

The clock input 12 is adapted for receiving clock pulses at a rate which generally depends upon the application in which the counter is used. In some applications, the clock pulses may be delivered at a uniform rate, such as a frequency on the order of a megahertz. In other applications, they may be delivered intermittently or in bursts.

The counting means includes first and second J–K flip-flops which are designated by the reference numerals A and B, respectively. These flip-flops are conventional logic elements, and each includes control inputs J and K, a toggle input T, a normal output Q, an inverted output $\overline{Q}$, and a reset input R. The toggle inputs are connected in parallel to the clock input terminal 12, and the J inputs are not used.

Each of the Q outputs of the flip-flops is capable of assuming both high and low logic levels, thus providing a total of four possible output states. However, only three of these states are utilized in the present invention, and the flip-flops are connected in such manner that they cannot assume the fourth output state. As is discussed more fully hereinafter, the flip-flops are connected for advancing cyclically through the three permitted output states in either direction. As is conventional in the description of flip-flops, the Q outputs of the flip-flops A and B are designated simply by the reference numerals A and B, respectively. Since the $\overline{Q}$ outputs are inversely related to the Q outputs, they are designated by the reference numerals $\overline{A}$ and $\overline{B}$, respectively.

Means is provided for resetting each of the flip-flops to its initial condition, that is with its Q output low. This means includes a reset input terminal 13 to which reset pulses can be applied. The reset inputs of the two flip-flops are connected in parallel to this terminal.

The steering means includes a first section which controls the signal applied to the K input of the flip-flop A and a second section which controls the signal applied to the K input of the flip-flop B. Each of these sections performs the function of an exclusive-NOR gate. The first section includes conventional NOR gates 16–18, with the output of the gate 18 being connected to the K input of the flip-flop A. The outputs of the gates 16 and 17 are applied to the inputs of the gate 18. The inputs of the gate 16 are connected to the down counting control input terminal 11 and to the Q output of the flip-flop B. The inputs of the gate 17 are connected to the up counting control input terminal 10 and to the $\overline{Q}$ output of the flip-flop B. The connections between the Q and $\overline{Q}$ outputs of the flip-flop B provide feedback which prevents the flip-flops from being locked in an illegal state with the Q outputs of both high.

The second section of the steering means includes NOR gates 21-23. The output of the gate 23 is connected to the K input of the flip-flop B, and this gate receives inputs from the outputs of the gates 21 and 22. The inputs of the gate 21 are connected to the down counting control input terminal 11 and to the $\overline{Q}$ output of the flip-flop A. The inputs of the gate 22 are connected to the up counting control input terminal 10 and to the Q output of the flop A.

Means is provided for decoding the outputs of the flip-flops A and B. This means includes a plurality of output terminals 26–28. The terminals 27 and 28 are connected directly to the Q outputs of the flip-flops A and B, respectively. An NOR gate 31 is connected for receiving inputs from the Q outputs of the flip-flops and delivering an output to the output terminal 26. Thus, the decoded output signal is a 3-bit signal, with one of the three bits being carried by each of the output terminals 26-28. The bits carried by the terminals 27 and 28 are A and B, the outputs of the flip-flops A and B, respectively, and the bit carried by the terminal 26 is $\overline{A+B}$, the NOR equivalent of the flip-flop outputs A and B.

In some applications, it may be desirable to utilize the inverse of the decoded output signal. Accordingly means is included for providing this inverted signal. This means includes output terminals 32–34 and an NOR gate 36. The output terminals 33 and 34 are connected directly to the $\overline{Q}$ outputs of the flip-flops A and B, respectively, and the gate 36 is connected as an inverter between the output of the gate 31 and the output terminal 32. Thus, the flip-flop outputs $\overline{A}$ and $\overline{B}$ are available at the terminals 33 and 34, respectively, and A+B is available at the terminal 32.

The means for generating a carry pulse includes a pair of control gates 41, 42 which are connected for receiving an input from the Q and $\overline{Q}$ outputs of the flip-flop B. These gates are conventional NOR gates. They are also connected for receiving enabling input signals from the input terminals 11 and 10. Additional NOR gates 43 and 44 are connected as inverters between the Q output of the flip-flop B and a third input of the gate 41 and between the $\overline{Q}$ output of the flip-flop B and a third input of the gate 42. The gates 43 and 44 have propagation times on the order of 50 nanoseconds, and as will appear hereinafter, they determine the width of the carry pulse. The outputs of the gates 41 and 42 are connected to the inputs of an output NOR gate 46, and the output of this gate is connected to a carry pulse output terminal 47. The gate 46 includes a third input which is connected to a terminal 48 which is adapted for receiving an input pulse to manually produce a carry pulse at the output terminal 47.

Operation and use of the reversible ternary counter can now be described briefly. For purposes of description, the three output states of the counting means can be referred to as "0," "1," "2" states. In the "0" state, the flip-flops are both in their reset condition, with A and B outputs of 0 0. In this condition, the decoded output signal is 1 0 0. In the "1" state, the A and B outputs are 1 0, and the decoded output signal is 0 1 0. In the "2" state, the outputs A and B are 0 1, and the decoded output signal is 0 0 1.

Initially, let it be assumed that the up counting control signal is high, thus conditioning the counter to count in an upward or positive direction. The first clock pulse causes the flip-flop A to toggle, making the A output high and advancing the decoded output signal from 1 0 0 to 0 1 0, thus stepping the counter to the "1" state. The second clock pulse causes both the flip-flops to toggle, making the A output low and the B output high, thereby advancing the decoded output signal 0 0 1 and setting the counter to the "2" state. The third clock pulse toggles only the flip-flop B, making the B output low, advancing the decoded output signal to 1 0 0 and returning the counter to the "0" state. As the counter passes from the "2" state to the "0" state, the Q output of the flip-flop B changes from high to low. During the interval required for this change to be propagated through the gate 43, the inputs at the gate 41 are all low, thus momentarily making the output of the gate 41 high and producing a negative going carry pulse at the output terminal 47. This carry pulse occurs as the counter overflows in the positive direction and returns from its highest state to its lowest state. The same phenomenon also occurs if the counter is reset by means of a reset pulse applied to the input terminal 13 while the counter is in the " 2" state.

Next let it be assumed that the down counting control input signal is high, thereby conditioning the counter to count in the downward or negative direction. Again, let it be assumed initially that the counters is in its "0" or reset state. The first clock pulse new causes only the flip-flop B to toggle, making the B output high, advancing the decoded output signal to 0 0 1, and stepping the counter to its "2" state. As the B output changes from low to high, the $\overline{Q}$ output of flip-flop B changes from high to low, producing a carry pulse at the output terminal 47. It should be noted this pulse occurs as the counting means overflows in the negative direction. The second clock pulse toggles both of the flip-flops, making the A output high and the B output low, thereby advancing the decoded output signal to 0 1 0, and setting the counter to its "1" state. The third clock pulse toggles only the flip-flop A making the output A low, thereby advancing the decoded output signal to 1 0 0 and setting the counter to its "0" state.

The operation of the ternary counter is illustrated more fully by the timing diagram of FIG. 4. This diagram shows the operation of the counter when the direction of counting is reversed with the counting means in each of its three output states.

FIG. 5 illustrates one embodiment of a counter having a plurality of counter stages of the type shown in FIG. 1 connected in cascade to provide $3^N$ output states. Each of these stages receives up and down counting control signals from the input terminals 10 and 11, and each receives reset pulses from the terminal 13. If desired, the reset inputs can be applied separately to each stage to permit the stages to be reset individually. The clock input of each stage after the first is connected to the carry output of the preceding stage. It will be noted that each stage includes three discrete output states, providing a total of $3^N$ outputs states, where N is the number of cascaded stages. Operation and use of this multiple stage counter is similar to that of the single stage counter illustrated in FIG. 1.

It is apparent from the foregoing that a new and improved reversible ternary counter has been provided. This counter has been described as utilizing NOR gates and NOR positive logic. However, other types of logic and logic elements can be used in the system if desired. While only one presently preferred embodiment of the counter has been described, as will be apparent to those familiar with the art, certain changes and modifications can be made without departing from the scope of the invention as defined by the following claims.

I claim:

1. In a ternary digital counter, a first input terminal for receiving an up counting control signal, a second input terminal for receiving a down counting control signal, counting means having three discrete output states, said counting means being adapted for cyclically advancing through said output states in both positive and negative directions, means for delivering clock pulses to said counting means, steering means connected to said input terminals and to said counting means for conditioning said counting means to advance in the positive direction in response to said clock pulses when said up counting control signal is present and advance in the negative direction in response to said clock pulses when said down counting control signal is present, means for resetting said counting means to a predetermined one of said output states, and means for generating a carry pulse when said counting means advances between predetermined output states and for generating a rounding carry pulse when said counting means is reset to said predetermined one of said output states from a predetermined other of said states.

2. A ternary counter as in claim 1 wherein said counting means includes first and second flip-flop means having toggle inputs to which said clock pulses are applied, control inputs to which said steering means is connected, and outputs capable of assuming high and low logic levels to provide the three discrete output states.

3. A ternary counter having a plurality of stages, each of said stages being of the character defined by claim 1, the clock input terminal of the counting means of each successive stage being connected for receiving the carry pulses from the preceding stage.

4. A ternary counter as in claim 1 wherein the means for generating a carry pulse includes a logic element having a predetermined propagation time, said element being connected in such manner that its propagation time determines the width of said carry pulse.

5. A ternary counter as in claim 4 wherein said counting means includes flip-flop means having a first output which is high when said counting means is in its highest output state and low when said counting means is in its lowest output state, said logic element being an NOR gate having a first input connected to the first output of said flip-flop means and a second input connected to be continuously low, said means for generating a carry pulse also including a first control gate connected for receiving inputs from the first output of said flip-flop means and from the output of the first named NOR gate.

6. A ternary counter as in claim 5 wherein said flip-flop means also has a second output which is the inverse of said first output wherein said means for generating a carry pulse also includes an additional NOR gate and a second control gate connected to said second output and to each other in the same manner in which the NOR and control gates are connected, means connecting the first and second input terminals of said counter to the control gates for selectively enabling said gates in accordance with the up and down counting control signals, and the output gate means connected for receiving inputs from the outputs of said control gates, the carry pulse appearing at the output of said output gate means.

7. In a ternary digital counter, a first input terminal for receiving an up counting control signal, a second input terminal for receiving a down counting control signal, counting means including first and second flip-flop means each having outputs capable of assuming high and low logic levels connected together to provide three discrete output states, said counting means being adapted for cyclically advancing through said output states in both positive and negative directions, means for delivering clock pulses to said counting means, steering means connected to said input terminals and to said counting means for conditioning said counting means to advance in the positive direction in response to said clock pulses when said upcounting control signal is present and to advance in the negative direction in response to said clock pulses when said down counting control signal is present, decoder means connected to the outputs of said flip-flop means for converting the logic levels of said outputs to a three-bit output signal, said decoder means including three output terminals each carrying one of the three bits in said output signal, means connecting two of said output terminals directly to the outputs of said flip-flop means, and logic means connected between the remaining output terminal and the outputs of said flip-flop means such that the bit carried by said remaining terminal is the logic NOR equivalent of the bits carried by the two directly connected output terminals.

8. A ternary counter as in claim 7 wherein each of said flip-flop means has both normal and inverted outputs and said steering means includes first and second sections, said first section comprising NOR gate means connected for receiving inputs from said first and second input terminals and delivering an output to the control input of said first flip-flop means, and said second section comprising NOR gate means connected for receiving inputs from said first and second input terminals and from the outputs of said first flip-flop means and delivering an output to the control input of said second flip-flop means.

9. A ternary counter as in claim 8 together with feedback means connecting the outputs of said second flip-flop means as inputs to the first section of said steering means, said feedback means serving to prevent said counting means from having an illegal output state.

10. In bidirectional ternary counting apparatus: means for receiving input signals; means for receiving an up-down control signal; reversible counting means having low, intermediate and high states; means for advancing the counting means from the low state to the intermediate state, from the intermediate state to the high state and from the high state to the low state in response to input signals received when the control signal indicates an up-counting condition; means for advancing the counting means from the low state to the high state, from the high state to the intermediate state and from the intermediate state to the low state in response to input signals received when the control signal indicates a down counting condition; means for generating a carry signal when said counting means is advanced from the high state to the low state or from the low state to the high state; means for resetting the counting means to the low state; and means for generating a rounding carry pulse when the counting means is reset to the low state from the high state.

11. Bidirectional ternary counting apparatus as in claim 10 together with means for generating an output signal pattern signifying the low, intermediate and high output states of the counting means.

* * * * *